United States Patent
Wall

(10) Patent No.: US 6,282,762 B1
(45) Date of Patent: Sep. 4, 2001

(54) CONNECTING ELEMENT FOR SHEET PILES

(76) Inventor: Georg Wall, Hans-Graessel-Weg 20, D-81375 Muenchen (DE)

(*) Notice: Subject to any disclaimer, the term of this patent is extended or adjusted under 35 U.S.C. 154(b) by 0 days.

(21) Appl. No.: 09/445,871

(22) PCT Filed: Jun. 4, 1998

(86) PCT No.: PCT/DE98/01525

§ 371 Date: Dec. 13, 1999

§ 102(e) Date: Dec. 13, 1999

(87) PCT Pub. No.: WO98/58131

PCT Pub. Date: Dec. 23, 1998

(30) Foreign Application Priority Data

Jun. 13, 1997 (DE) ................................. 197 25 143

(51) Int. Cl.[7] ................................. A44B 21/00; E02D 5/08
(52) U.S. Cl. ..................... 24/573.09; 24/346; 24/370; 24/597; 24/598.5
(58) Field of Search ................ 24/573.1, 597, 24/598.5, 339, 346, 370

(56) References Cited

U.S. PATENT DOCUMENTS

| 912,021 | 2/1909 | Neilson . |
| 1,003,777 | 9/1911 | Neilson . |
| 1,806,967 | 5/1931 | Dougherty et al. . |
| 3,374,620 | * 3/1968 | Gower ..................... 24/370 |
| 5,692,270 | * 12/1997 | Dunn ....................... 24/370 |
| 5,836,056 | * 11/1998 | Cooper ..................... 24/239 |

FOREIGN PATENT DOCUMENTS

| 410707 | 3/1925 | (DE) . |
| 443556 | 5/1927 | (DE) . |
| 734616 | 4/1943 | (DE) . |
| 2018119 | 11/1970 | (DE) . |
| 3907348 | 9/1990 | (DE) . |
| 29718052 | 12/1998 | (DE) . |
| 19725143 | 1/1999 | (DE) . |
| 0795649 | 9/1997 | (EP) . |
| 378575 | 8/1932 | (GB) . |
| 2131856 | 6/1984 | (GB) . |
| 222876 | 9/1990 | (GB) . |
| WO 97/39193 | 3/1997 | (WO) . |

* cited by examiner

*Primary Examiner*—Victor N. Sakran
(74) *Attorney, Agent, or Firm*—Milde, Hoffberg & Macklin, LLP

(57) ABSTRACT

A connecting element for sheet piles has a cross-section the shape of which is reminiscent of a seahorse, insofar as it forms two hook bars (3, 4) having relatively large inner spaces (8, 14). The hook bars (3, 4) securely grasp the hook bars (21, 22) of adjoining sheet piles (24, 25), thereby enabling the connection of sheet piles at different angles.

5 Claims, 2 Drawing Sheets

CONNECTING ELEMENT FOR SHEET PILES

BACKGROUND OF THE INVENTION

This invention relates to a connecting element for sheet piles sheet piles extending at an angle to each other. The connecting element has a central web strip with an upper hook strip and a lower hook strip extending outward on the two longitudinal edges thereof. The hook strips point with their curvature in opposite directions and are adapted to engage corresponding hook strips of the shet piles to be connected.

Such connecting elements are known in a plurality of shapes and designs; they are used for interconnecting sheet piles of sheet-pile walls, in particular for interconnecting two abutting sheet piles of sheet-pile walls extending at an angle to each other.

A known connecting element, designated corner section 20, for connecting the sheet piles of sheet-pile walls extending at a 90° angle to each other has approximately an S-section and a substantially straight web strip with two oppositely directed hook strips extending on the two sides thereof. One of the hook strips is formed smaller than the other; both engage corresponding hook strips of the sheet piles to be connected.

This element can only be used for connecting sheet piles extending at a 90° angle to each other. When the connecting elements are driven, however, it sometimes happens that the smaller of the hook strips jumps out of the corresponding hook strip of the sheet pile to be connected so that—if this is noticed at all—work must be interrupted and started again.

A further connecting element, designated a delta and described in DE-OS 20 18 199, again has a small hook strip on one side of a web strip and a larger hook strip of sickle-shaped cross section on the other side thereof. This section has the advantage that one can connect sheet piles to the sickle-shaped hook strip over a certain angle range and thus also interconnect sheet-pile walls extending at an angle other than 90°. The angle stated is between 90° and 135°. The smaller of the hook strips has the same construction in this section as in the abovementioned corner section 20, so that during driving this hook strip can in fact slide out of the corresponding hook strip of the sheet pile to be connected.

For these reasons it is the rule to weld the abovementioned corner section 20 and the delta section with their smaller hook strips to one of the sheet piles and only then drive this assembly. This results in considerable labor for producing sheet piles.

DE-A1 3907348 discloses extruded connecting elements to which one can connect sheet piles of the abovementioned Larssen type but also the knob-and-claw type. The connecting elements have for this purpose differently shaped hook strips which, as indicated by FIGS. 4 to 6 therein, always require shape-mating with the locks of the sheet piles. Thus the same difficulties are given here as with the abovementioned corner section 20. However, the continuous casting production method permits more diverse shapes of the connecting strips and smaller dimensional tolerances to be achieved than with rolled sections.

It is common to all three aforementioned sections that they are only used in conjunction with one type of sheet-pile wall. The most frequent sheet piles are ones with so-called Larssen locks having on their two longitudinal edges hook portions corresponding approximately to the smaller hook strip of the connecting element according to abovementioned DE-OS 20 18 119. The dimensions of these hook strips in addition vary from manufacturer to manufacturer so that one can only use connecting elements and sheet piles from the same manufacturer.

SUMMARY OF THE INVENTION

The invention is based on the problem of providing a connecting element for sheet piles of the kind in question which can be used in conjunction with existing sheet pile sections in particular with Larssen locks and which cannot jump out of the hook strip of a pile to be connected. Furthermore, the connecting angle of sheet-pile walls extending at an angle to each other should be clearly enlarged over the prior art.

This problem is solved according to the invention by the following features:
  a) both hook strips have substantially the same construction and a continuous sickle-shaped curvature, the arcs of the curvature being greater than 180° and no more than about 250°;
  b) on the upper part of the central web strip is a projection which at the same time forms the beginning of the upper hook strip and whose direction is approximately perpendicular to the flat area of the central web strip;
  c) the lower part of the central web strip passes continuously into the lower hook strip;
  d) an imaginary prolongation in the direction of the extension of the end of the upper hook strip points away from the central web strip and forms an acute angle of about 25° to 30° with a vertical direction parallel to the flat area of the central web strip;
  e) a center line through the opening and the interior space of the upper hook strip is inclined downward and forms an acute angle of about 45° with the prolongation of the flat area of the web strip;
  f) an imaginary prolongation in the direction of the extension of the end of the lower hook strip is directed toward the central web strip; and
  g) a center line through the opening and the interior space of the lower hook strip forms an acute angle with the flat area of the web strip.

The hook strips are accordingly of C-shaped or sickle-shaped cross section, the arcs of the two sickle-shaped hook strips being greater than 180° and preferably in the range between about 225° and 250°. The sickle opening of one, upper hook strip points away from the web and begins on a projection on the upper part of the central web strip, while the sickle opening of the lower hook strip, which is a continuous extension of the lower part of the central web strip, points in a direction substantially parallel to the web strip and slightly inclined toward it.

The smooth arc-shaped inside walls of the two hook strips generously encompass the corresponding hook strips of the sheet piles to be connected, producing three-point contact or sufficient interlocking between the hook strips of the sheet piles to be connected and the hook strips of the connecting element. This manner of encompassing, in particular the curvature shape of the hook strips in conjunction with the projection as a stop and the sickle opening directed slightly toward the web strip, cause the lock, i.e. the hook strip of a sheet pile to be connected, to be quasi bolted so that the connecting element cannot slide out of the hook strip of the sheet pile to be connected during driving.

A further advantage is that the sheet-pile walls to be connected via the connecting element according to the invention can assume an angle between about 45° and about 125°, a reliable connection being given in all angle ranges and the element being reliably prevented from jumping out of the hook strip during driving. The angle range is determined by the lock size, i.e. the size of the hook strips of the sheet piles to be connected.

The generously dimensioned sickle-shaped hook strips not only prevent the element from jumping out of hook strips of sheet piles to be connected, but also permit a relatively great tolerance range for sheet-pile walls to be joined since the connecting elements can be swiveled to compensate dimensional tolerances in the range of a few centimeters.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
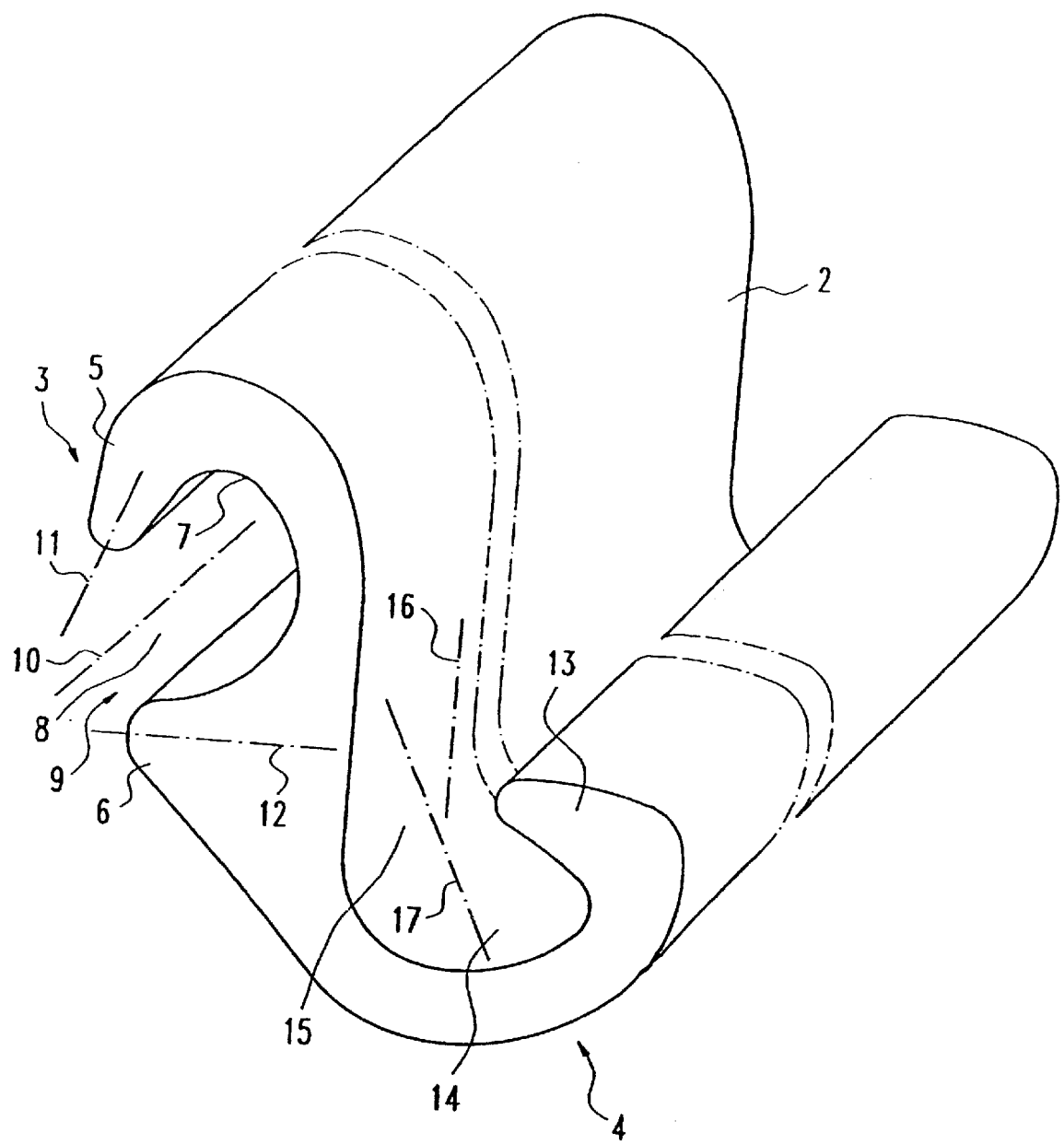
FIG. 1 shows a schematic perspective view of a connecting element for sheet piles according to the invention.

The preferred embodiments of the present invention will now be described with reference to FIGS. 1–3 of the drawings. Identical elements in the various figures are designated with the same reference numerals.

Connecting element 1 has central web strip 2 with first hook strip 3 extending on one longitudinal edge thereof and second hook strip 4 on the other longitudinal edge thereof, being referred to in the following as upper and lower hook strips, respectively. The side of central web strip 2 on the right in the figure has a centric flat portion which passes in the upper area into a semicircular arc and finally into approximately downward pointing claw strip 5 of hook strip 3. On the side opposite the flat area of the central web strip the web strip has projection 6 limiting the lower area of hook strip 3. Between hook strip 5 and projection 6 smooth inside wall 7 extends approximately in the shape of a circular arc or C, causing hook strip 3 to be is- or sickle-shaped. Hook strip 3 thus has interior space 8 limited by inside wall 7 between claw strip 5 and projection 6 and having sickle opening 9 pointing away from central web strip 2. In FIG. 1 center line 10 for upper hook strip 3 is dash-dotted and divides interior space 8 into two roughly equal halves. One sees that center line 10 is inclined downward, i.e. has an acute angle of about 45° in this case to the vertical direction of the flat area of the central web strip. Dash-dotted line 11 indicates the direction of claw strip 5; one sees that it has an even more acute angle of about 25 to 30° to the vertical direction. Dash-dotted line 12 indicates approximately the direction of projection 6 which is perpendicular to the flat area of central web strip 2. These angles are of course variable within certain ranges. The arc of the C or sickle shape of hook strip 3 between projection 6 and claw strip 5 thus goes beyond 180° and is in this case approximately 250°. Good results for the connection are obtained with angles between 210 and 275°, whereby the depth of interior space 8 of the hook strip measured between sickle opening 9 and the wall of central web strip 2 has approximately the width of sickle opening 9.

Lower hook strip 4 has an approximately identical construction to upper hook strip 3, thus again having claw strip 13, interior space 14 and sickle opening 15. Since the lower hook strip joins up directly with the flat area of the central web strip, the sickle opening points upward approximately parallel, as indicated by dash-dotted line 16. If one again plots center line 17 of interior space 14 as for hook strip 3, one sees that this line extends at an acute angle to the vertical direction of web strip 2 so that one can say that sickle opening 15 is inclined toward the flat area of the central web strip or points thereto.

This FIG. 1 also clearly shows that the cross section of connecting element 1 is greatly reminiscent of the shape of a sea horse.

Figure 2:
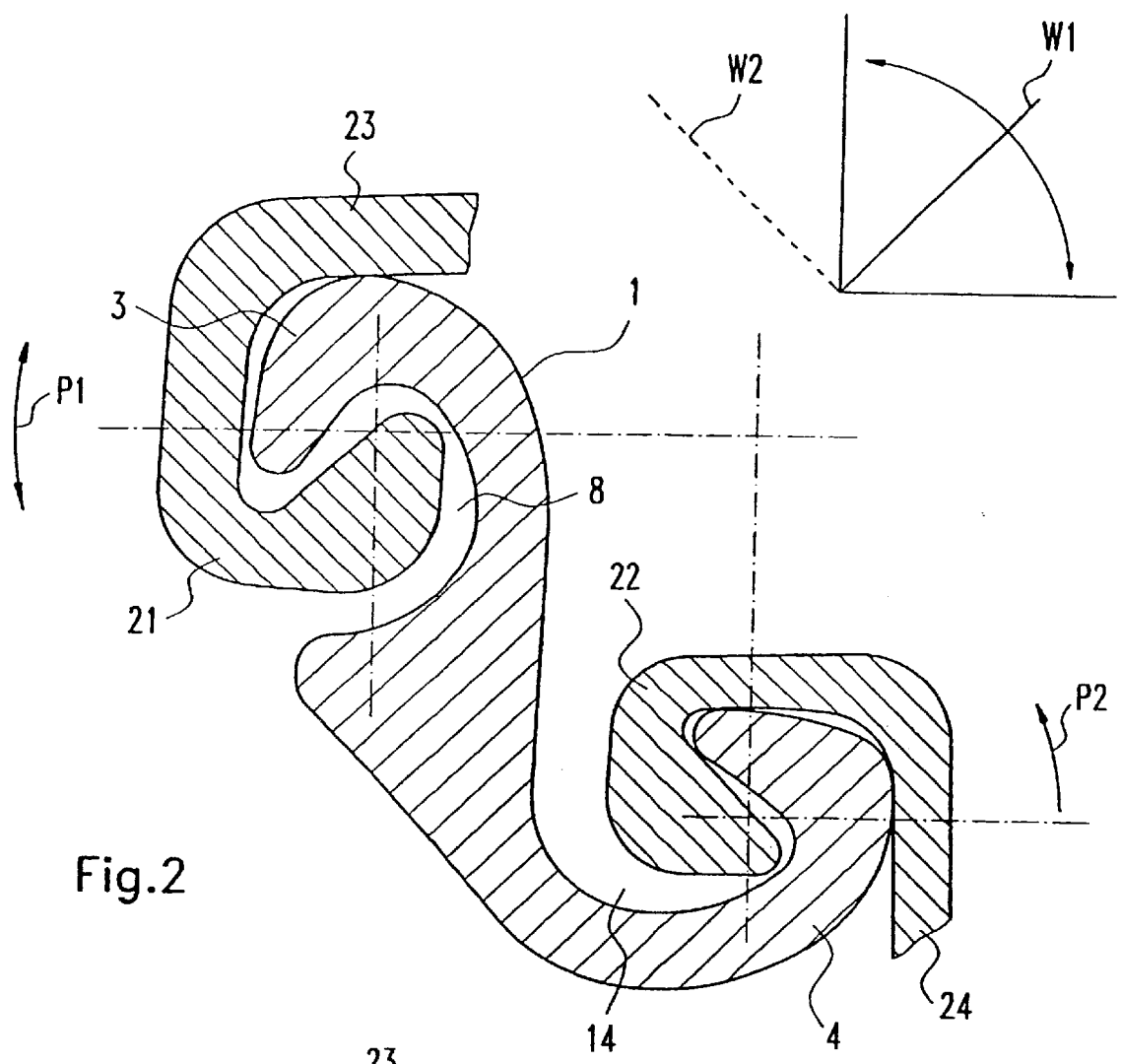
FIG. 2 shows a cross section through the connecting element with a schematic view of the connected hook strips of two sheet piles.

FIG. 2 shows schematically the coupling of connecting element 1 to two hook strips 21 and 22 of sheet piles 23, 24 to be connected. One sees that hook strips 21 and 22 are well encompassed by the large C-shaped openings of the two hook strips 3 and 4 of connecting element 1 and permit reliable connection of the two sheet piles. Furthermore, the connecting angles of sheet piles 23 and 24 can be different, as indicated by arrows P1 and P2, the diagram above this figure showing the minimum connecting angle as W1 and the maximum connecting angle as W2. Minimum angle W1 is approximately 45°, maximum angle W2 approximately 135°.

Figure 3:
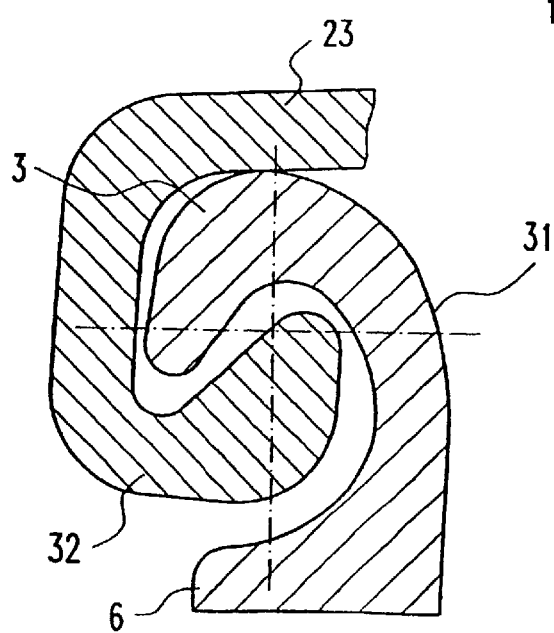
FIG. 3 shows a welding corner obtained by separation of the connecting element with the view of the connection to a sheet pile.

The connecting element can also be cut open in the area of the projection, resulting, as shown in FIG. 3, in corner or welding ledge 31 which can be welded with its base corresponding to projection 6 to the wall of a sheet pile so that further hook strip 32 of sheet pile 33 to be connected can be introduced at a certain angle into hook strip 3 protruding away from the wall. In FIG. 3 corner ledge 31 corresponds to the part of connecting element 1 containing upper hook strip 3; it is of course possible to use the lower part with hook strip 4 as a corner ledge as well.

There has thus been shown and described a novel connecting element for sheet piles which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a connecting element for sheet piles, in particular for connecting sheet piles extending at an angle to each other, having a central web strip with an upper hook strip and a lower hook strip extending on the two longitudinal edges thereof, the hook strips pointing with their curvature in opposite directions and being adapted to engage corresponding hook strips of sheet piles to be connected the improvement wherein
   a) both hook strips have substantially the same construction and a continuous sickle-shaped curvature, the arcs of the curvature being greater than 180° and no more than about 250°;
   b) on the upper part of the central web strip is a projection which at the same time forms the beginning of the upper hook strip and whose direction is approximately perpendicular to the flat area of the web strip;
   c) the lower part of the web strip passes continuously into the lower hook strip;

d) an imaginary prolongation in the direction of the extension of the end of the upper hook strip points away from the web strip and forms an acute angle of about 25° to 30° with a vertical direction parallel to the flat area of the central web strip;
e) a center line through the opening and the interior space of the upper hook strip is inclined downward and forms an acute angle of about 45° with the prolongation of the flat area of the web strip;
f) an imaginary prolongation in the direction of the extension of the end of the lower hook strip is directed toward the web strip; and
g) a center line through the opening and the interior space of the lower hook strip forms an acute angle with the flat area of the web strip.

2. A connecting element according to claim 1, wherein the center line for the upper hook strip divides the interior space into two roughly equal halves.

3. A connecting element according to claim 1, wherein the center line for the lower hook strip divides the interior space into two roughly equal halves.

4. A connecting element according to claim 1, wherein the formation of the hook strips and their smooth arc-shaped inside walls sufficiently interlock with the hook strips of the sheet piles to be connected and yield a reliable connection, without the element jumping out of the hook strips, in all angle ranges possible with the sheet piles.

5. A connecting element according to claim 1, wherein said angle range is approximately between 45° and 135°.

* * * * *